US 6,681,323 B1

(12) United States Patent
Fontanesi et al.

(10) Patent No.: US 6,681,323 B1
(45) Date of Patent: Jan. 20, 2004

(54) METHOD AND SYSTEM FOR AUTOMATICALLY INSTALLING AN INITIAL SOFTWARE CONFIGURATION INCLUDING AN OPERATING SYSTEM MODULE FROM A LIBRARY CONTAINING AT LEAST TWO OPERATING SYSTEM MODULES BASED ON RETRIEVED COMPUTER IDENTIFICATION DATA

(75) Inventors: Jeffrey Robert Fontanesi, Orange, CA (US); Heather Howard, Corona, CA (US); Bruce Stuart, Tustin, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/450,163

(22) Filed: Nov. 29, 1999

(51) Int. Cl.⁷ .......................... G06F 15/177; G06F 3/00; G06F 9/445
(52) U.S. Cl. .............................. 713/1; 710/10; 717/174
(58) Field of Search ............................... 713/1, 2, 100; 710/10; 717/174

(56) References Cited

U.S. PATENT DOCUMENTS

| | | | |
|---|---|---|---|
| 5,555,416 A | | 9/1996 | Owens et al. |
| 5,717,930 A | | 2/1998 | Imai et al. |
| 5,742,829 A | | 4/1998 | Davis et al. |
| 5,794,052 A | * | 8/1998 | Harding ...................... 717/178 |
| 5,799,187 A | * | 8/1998 | McBrearty ...................... 713/2 |
| 5,892,906 A | * | 4/1999 | Chou et al. .................. 713/202 |
| 6,006,190 A | * | 12/1999 | Baena-Arnaiz et al. ......... 705/1 |
| 6,016,400 A | * | 1/2000 | Day et al. ....................... 713/2 |
| 6,094,531 A | * | 7/2000 | Allison et al. ............... 717/176 |
| 6,097,991 A | * | 8/2000 | Hamel et al. ........... 340/825.22 |
| 6,154,835 A | * | 11/2000 | Chrabaszcz et al. .......... 710/10 |
| 6,170,056 B1 | * | 1/2001 | Sidie .......................... 710/220 |
| 6,247,128 B1 | * | 6/2001 | Fisher et al. ................ 713/100 |
| 6,282,712 B1 | * | 8/2001 | Davis et al. ................ 717/170 |

FOREIGN PATENT DOCUMENTS

JP 06222910 A * 8/1994 ............. G06F/9/05

OTHER PUBLICATIONS

Ofer Wolfgor, Miantenance of system software on a wide area network of mainframes, May 1991, Computer Systems and Software Engineering Proceedings, pp. 113–119.*

* cited by examiner

Primary Examiner—Dennis M. Butler
Assistant Examiner—Suresh K Suryawanshi
(74) Attorney, Agent, or Firm—Pillsbury Winthrop LLP

(57) ABSTRACT

A method for automatically installing an initial software configuration on at least one target computer in an installation system. The at least one target computer is booted from a boot storage medium. Identification data associated with the hardware configuration of the target computer is automatically retrieved from the memory of the at least one target computer. Data representative of software component modules is automatically transferred from a library of software component modules stored on a library storage medium to the memory of the target computer based on the retrieved identification data associated with the hardware configuration of the target computer. The transferred software component modules are automatically installed onto the memory of the target computer.

45 Claims, 5 Drawing Sheets

METHOD AND SYSTEM FOR AUTOMATICALLY INSTALLING AN INITIAL SOFTWARE CONFIGURATION INCLUDING AN OPERATING SYSTEM MODULE FROM A LIBRARY CONTAINING AT LEAST TWO OPERATING SYSTEM MODULES BASED ON RETRIEVED COMPUTER IDENTIFICATION DATA

BACKGROUND

1. Field of the Invention

This invention relates to methods and systems for installing software onto a computer, and, in particular embodiments, methods and systems for automatically installing an initial software configuration onto a computer.

2. Related Art

Generally, computer manufacturers sell a number of different types (e.g., desktop, laptop) and models (e.g., Toshiba Equium 7100 Desktop Series, 3200 Series, Tecra 8000 Series laptop, Libretto 110 Series laptop) of computers with different hardware configurations (e.g., different processors, processing speed, amount of RAM, hard disk drive storage, peripheral devices, and the like). Such computers are typically sold with an initial software configuration (including an operating system, device drivers, and software applications) pre-installed on a hard disk drive of the computer. Factory installation of an initial software configuration onto multiple computers usually involves manually installing each software program onto a sample computer as desired. Once the manual installation is completed, the disk image is saved onto a storage medium (e.g., compact disk, hard disk drive of another computer, or the like) as one or more compressed files, which represent all of the properly installed software programs and the properly configured operating environment of the computer. The compressed disk image file(s) is then duplicated onto each computer to be delivered with the initial software configuration. The drawback of this disk imaging method is that it requires the creation of multiple boot disks for the different types, models, and hardware configurations of computers, as well as different operating systems, device drivers, and software applications to be installed onto the computers. For example, different boot disks are required to install Windows® 95, Windows 98, Windows NT, or OS/2 onto different computers. Such use of multiple boot disks makes factory installation of initial software configurations onto multiple computers a cumbersome process. Additionally, a factory worker is often needed to enter the type, model, and hardware configuration of the computer in order to determine which software programs (e.g., device drivers) to install onto the computer. Because such user interaction is required, factory installation of initial software configurations onto multiple computers cannot be an automatic process, and thus, is inefficient. Furthermore, during installation of the initial software configuration onto the computer, an initial boot of the computer as well as one or more reboots of the computer are generally required. In order to keep track of which boot or reboot has been performed, a process flag is typically written to the boot disk. However, such writing to the boot disk involves a risk of infecting the boot disk with a virus.

SUMMARY OF THE INVENTION

It is an object of embodiments of the present invention to provide a method and a system for automatically installing an initial software configuration onto a computer, which obviate for practical purposes, the above mentioned limitations.

According to an embodiment of the present invention, an installation system includes one or more target computers having different hardware configurations. Each target computer also has a memory and identification data associated with its hardware configuration, such as a unique part number, for indicating the particular hardware configuration of the target computer. To install an initial software configuration onto each of the target computers, a boot storage medium is placed in each of the target computers. Each boot storage medium includes logic and other data for booting each of the different target computers and automatically installing an initial software configuration onto each of the target computers. The identification data associated with the hardware configuration of each target computer is automatically retrieved from the memory of the target computer, and a software bundle is automatically retrieved and transferred from a library of software bundles to the memory of the target computer based on the retrieved identification data. The transferred software bundle is then installed onto the memory of the target computer, preferably the hard disk drive.

Because each boot storage medium includes logic and other data for booting each of the different target computers and automatically installing an initial software configuration onto each of the target computers, multiple versions of the boot storage media for the different target computers are not required. Instead, a single version of the boot storage medium is required. Additionally, once a target computer is booted from the boot storage medium, the installation process is entirely automatic and requires no user interaction, and thus, is more efficient.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
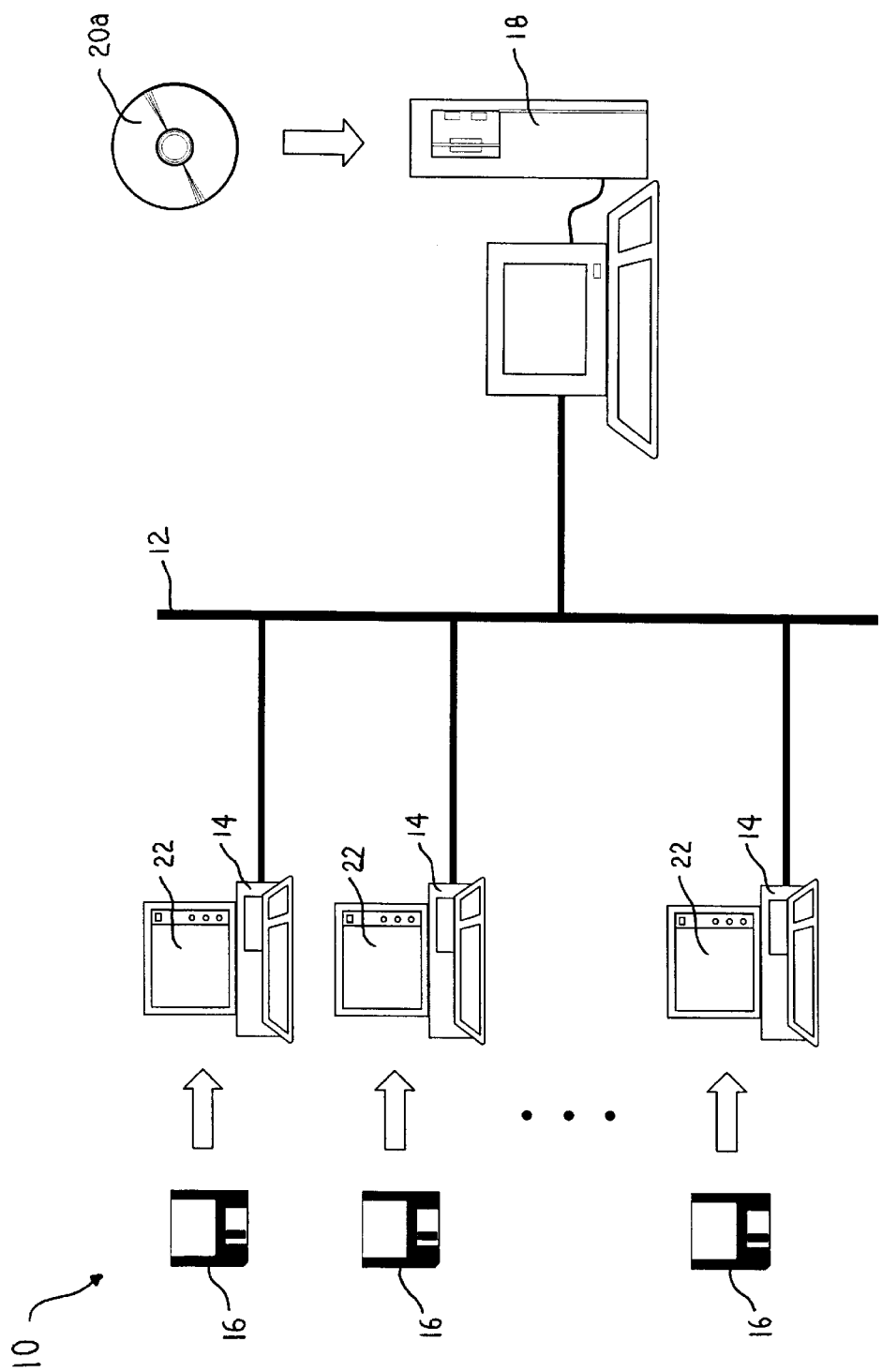
FIG. 1 illustrates a system for automatically installing an initial software configuration onto a computer in accordance with an embodiment of the present invention.

As shown in the drawings for purposes of illustration, embodiments of the present invention are directed to a method and a system for automatically installing an initial software configuration or pre-install onto one or more target computers. In preferred embodiments, the target computers are of different types (e.g., desktop, laptop) and models (e.g., Toshiba Equium 7100 Desktop Series, 3200 Series, Tecra 8000 Series laptop, Libretto 110 Series laptop). Accordingly, the target computers have different hardware configurations (e.g., different processors, processing speed, amount of RAM, hard disk drive storage, peripheral devices, and the like), which support different software configurations (e.g., different operating systems, such as Windows® 95, Windows 98, Windows NT, and OS/2; device drivers; and software applications, such as a word processor, a spreadsheet, and the like). Each target computer also has identification data associated with its hardware configuration, such as a unique part number, for indicating the particular type, model, and hardware configuration of the target computer. For example, Part Number PV 1046U-D34J0 represents an Equium 7100 Desktop Series computer with a Pentium® II 400 MHz processor, 64 MB SDRAM, 6.0 GB hard disk drive, 32X CD-ROM drive, and other hardware characteristics.

To install an initial software configuration onto one or more of the target computers, a boot storage medium, such as a removable floppy disk, is placed in each of the target computers. Each boot storage medium includes logic and other data for booting each of the different types and models of target computers and automatically installing an initial software configuration onto each of the target computers. In other words, the same version of the boot storage medium is placed into all of the target computers, regardless of the hardware configuration of the target computer or the initial software configuration to be installed onto the target computer. Different versions of the boot storage media for installing different initial software configurations (e.g., different operating systems, such as Windows® 95, Windows 98, Windows NT, or OS/2) are not necessary.

Once a target computer is booted from the boot storage medium, the installation process is entirely automatic and requires no user interaction. The identification data associated with the hardware configuration of each target computer, preferably the unique part number, is automatically retrieved from the memory, preferably the BIOS storage area, of the target computer, and a software bundle is automatically retrieved and transferred from a library of software bundles stored on a library storage medium to the memory of the target computer based on the retrieved identification data. The library storage medium may be a memory, such as a hard disk drive or a compact disk placed in a CD-ROM drive, of a remote installation server connected to the target computers through a network connection. Alternatively, the library storage medium may be a compact disk local to the target computer. The transferred software bundle is then installed onto the memory of the target computer, preferably the hard disk drive. In preferred embodiments, the software bundle includes an operating system, one or more device drivers, and one or more software applications (e.g., a word processor, a spreadsheet, and the like) appropriate for the hardware configuration of the target computer. In alternative embodiments, the device drivers and/or software applications may be omitted from the software bundle.

FIG. 1 illustrates the operational environment for the installation method and the basic components of the installation system in accordance with an embodiment of the present invention. In preferred embodiments, the installation system 10 includes a communications link 12, such as a local area network (LAN) 12. The installation system 10 also includes one or more target computers 14 and a remote installation server 18, which are interconnected through the LAN 12 in a manner well known to those having skill in the art. In alternative embodiments, the communications link 12 may include any other private, public, or hybrid private/public communications network which transfers data packets among computers in the network.

In the embodiment illustrated in FIG. 1, the installation system 10 includes a remote installation server 18. The remote installation server 18 includes memory (such as RAM, ROM, and a hard disk drive) and at least one processor. Software bundles, each of which preferably include an operating system, one or more device drivers, and one or more software applications (e.g., a word processor, a spreadsheet, and the like), are transferred from one or more removable storage media 20a (such as a floppy disk, a compact disk, a zip drive, or the like) and stored on the memory of the installation server 18, preferably the hard disk drive.

In one embodiment, each software bundle is stored as one or more compressed disk image files that are capable of automatically installing the software onto a computer and configuring the environment of the computer without any user interaction. The software bundle is packaged by first completely installing each desired software program (e.g., operating system, device driver(s), software application(s)) onto a clean hard disk drive of a computer. The computer is then booted from a boot disk, and the image of the hard disk drive is compressed into one or more disk image files using a compression utility program such as PKZIP™.

In preferred embodiments, the software bundles are stored in a library on the memory of the installation server 18, preferably the hard disk drive, along with tools (software programs and procedures) for installing the software bundles onto the target computer 14. In one embodiment, the library is arranged into one or more directories on the memory of the installation server 18. Each directory corresponds to a distinct initial software configuration or pre-install for a target computer 14 and includes the software bundle to be installed onto the target computer 14 as well as the tools for installing the software bundle onto the target computer 14. Generally, each pre-install corresponds to a particular type, model, and hardware configuration of a target computer 14. However, it is possible for a single pre-install to correspond to different types and models of target computers 14 with similar hardware configurations. In alternative embodiments, the library of software bundles may be arranged in a different structure on the memory of the installation server 18.

In preferred embodiments, the installation server 18 also maintains a database in the memory of the installation server 18, preferably the hard disk drive. The database stores information regarding the contents of the library of software bundles, including the organization of directories in the library, certain pre-install definitions, and all other data used in installing an initial software configuration onto each of the target computers 14. In one embodiment, each database record associates a unique part number with a particular type, model, and hardware configuration of a target computer 14. Each database record also identifies the corresponding directory in the library of software bundles, which contains the initial software configuration (i.e., pre-install) for the particular target computer 14 associated with that part number. Each database record further includes a pre-install definition, describing which software programs are included in the pre-install for the particular target computer. 14 and how the software programs will be configured on the target computer 14. The pre-install definition may include a list of the operating system, device driver(s), and/or software application(s) to be installed onto the target computer 14; instructions for partitioning and formatting the hard disk drive of the target computer 14; and settings for configuration of the operating environment of the target computer 14. In alternative embodiments, the pre-install definition may be stored in the library directory which contains the pre-install for the particular target computer 14, rather than in the database. In further alternative embodiments, each database record may include other information regarding the contents of the library of software bundles, such as other identification data associated with the hardware configuration of the target computer 14 (e.g., the model name and number of the target computer 14), characteristics of the software bundles (e.g., the order in which software programs must be installed because certain software programs may require other software programs to exist before they can be installed, dependencies among the software programs), or the like.

In the embodiment illustrated in FIG. 1, the installation system 10 further includes one or more target computers 14. Each target computer 14 includes memory (such as RAM, ROM, and a hard disk drive) and at least one processor. Each target computer 14 also includes an output device 22, such as a display 22. Each target computer 14 may further include an input device, such as a keyboard, a mouse, or the like, but such input device may be omitted. An initial software configuration, preferably including an operating system, one or more device drivers, and one or more software applications (e.g., a word processor, a spreadsheet, and the like), will be installed onto the memory of the target computer 14.

To install an initial software configuration or pre-install onto one or more of the target computers 14, a boot storage medium 16, preferably a removable floppy disk, is placed in each of the target computers 14. Each boot storage medium 16 includes instructions or logic for booting all of the different types and models of target computers 14. In other words, the same version of the boot storage medium 16 may be used for all of the target computers 14, regardless of the hardware configuration of the target computer 14 or the initial software configuration to be installed onto the target computer 14. Different versions of the boot storage media 16 for installing different initial software configurations (e.g., different operating systems, such as Windows® 95, Windows 98, Windows NT, OS/2) are not necessary.

Figure 3A:
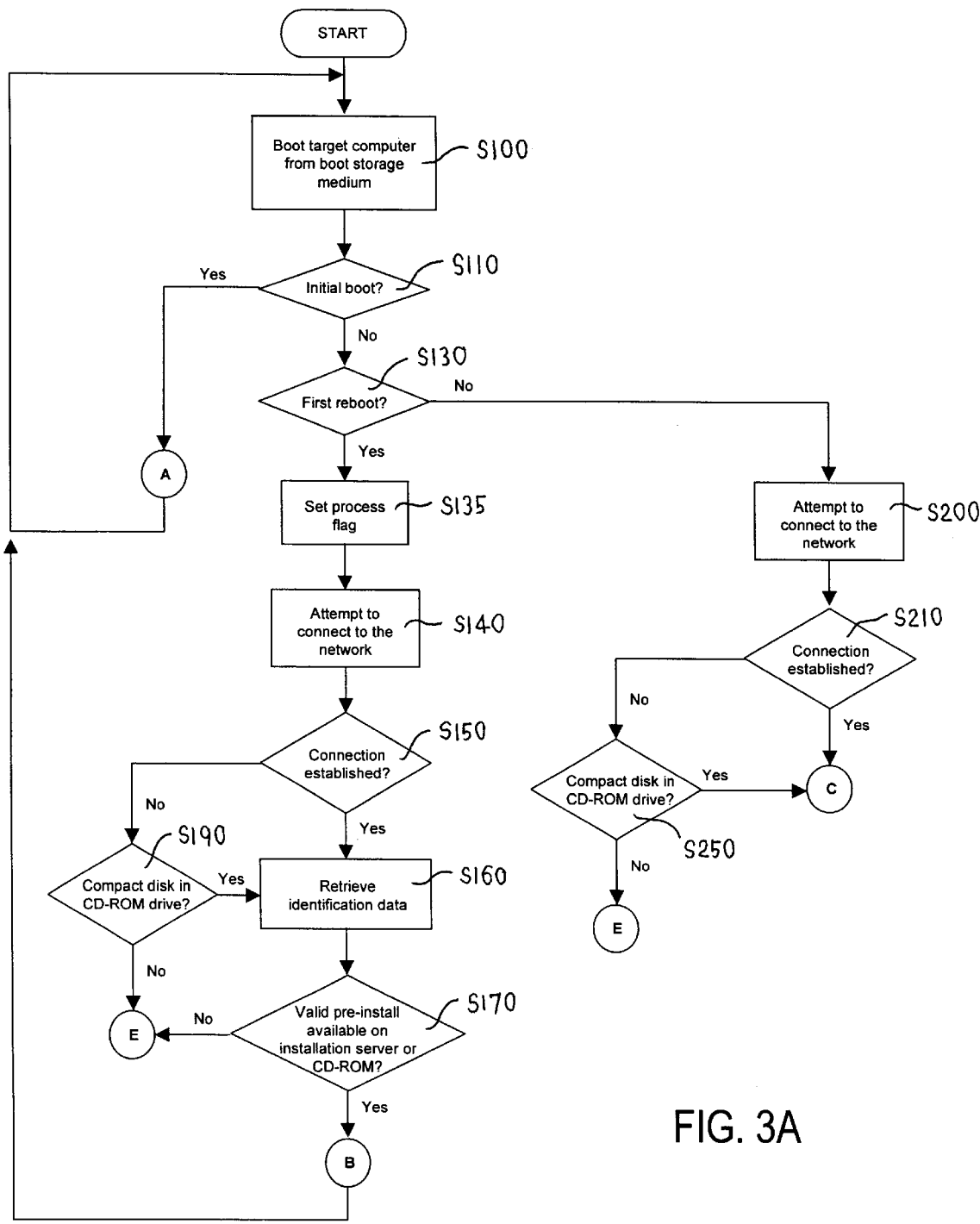
FIGS. 3A–3C are flowcharts illustrating a method for automatically installing an initial software configuration onto a computer in accordance with an embodiment of the present invention.
Figure 3B:
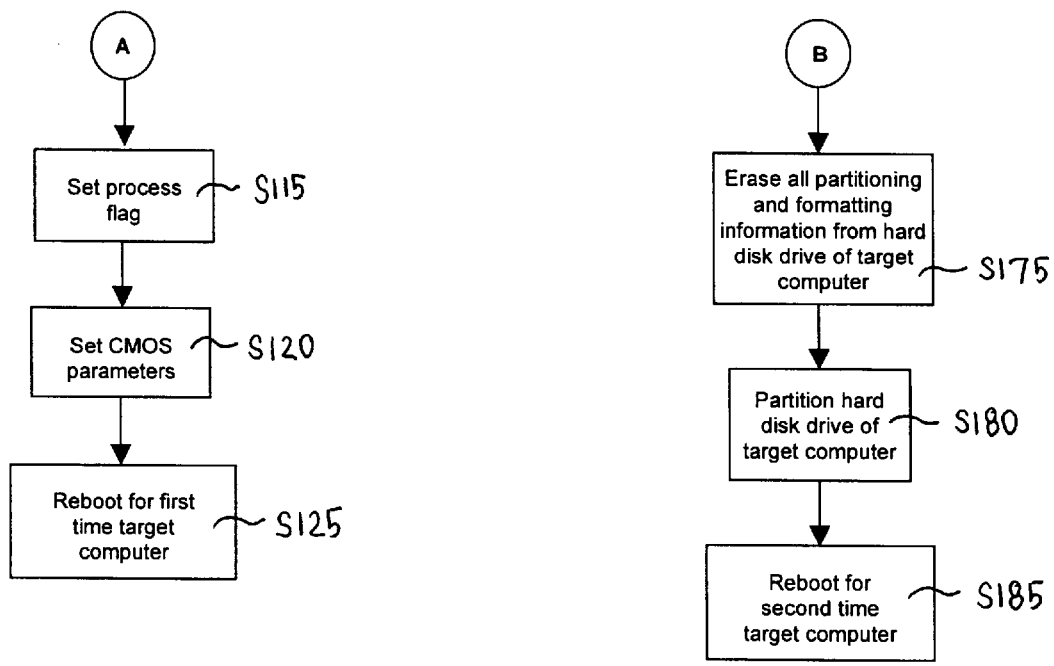
Figure 3C:
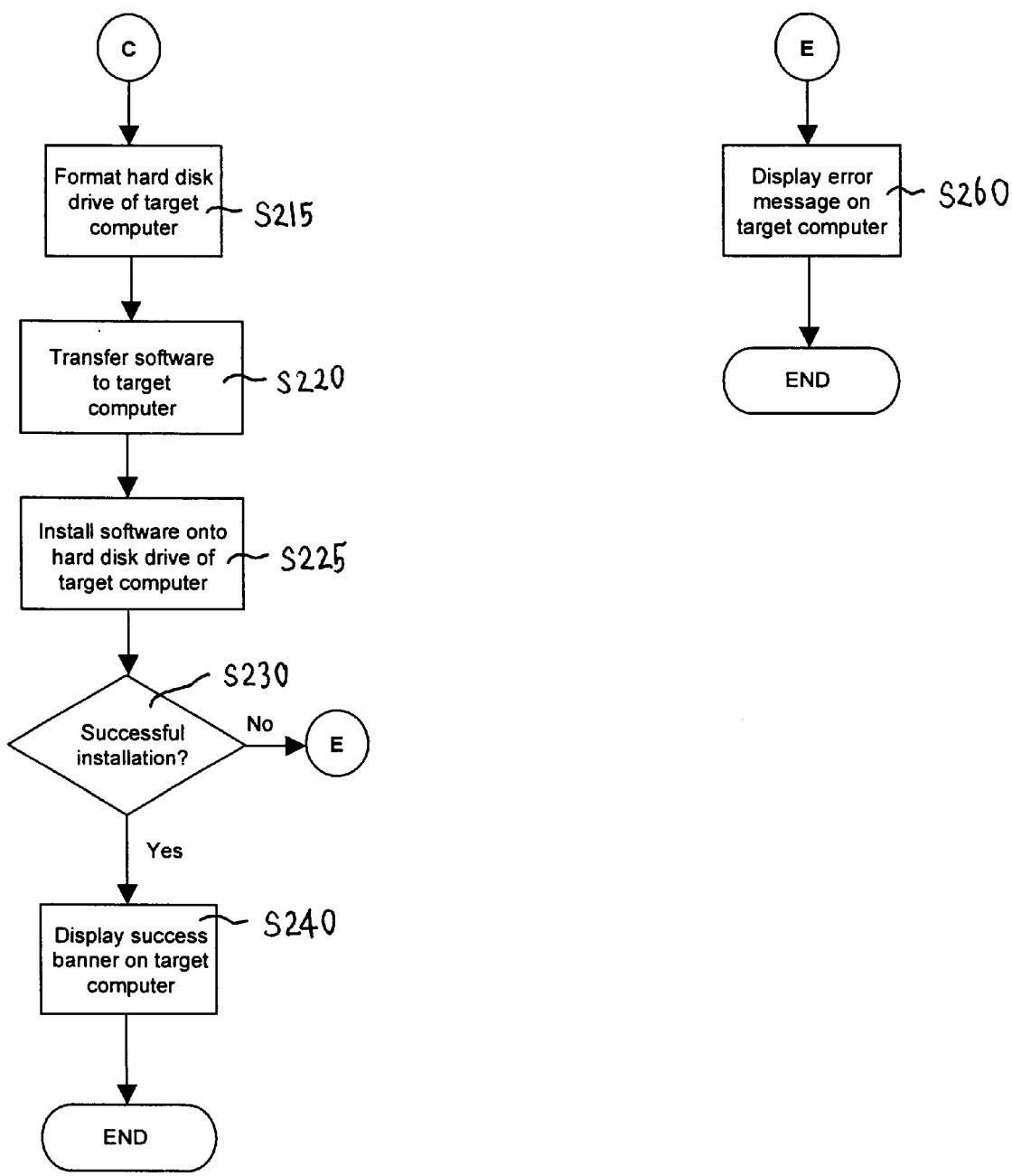

FIGS. 3A–3C are flowcharts illustrating a method for automatically installing an initial software configuration onto a target computer in accordance with an embodiment of the present invention. At step S100, the boot storage medium 16 boots the target computer 14 using a series of batch files and program files. Once the target computer 14 is booted from the boot storage medium 16, the installation process is entirely automatic and requires no user interaction. In preferred embodiments, the boot storage medium 16 includes all of the necessary logic and other data for automatically installing an initial software configuration on the target computer 14.

At step S110, after the target computer 14 is initially booted, it is determined that the initial booting step has just been performed. During the installation process, the target computer 14 will be rebooted several times. Therefore, a process flag is stored on the memory of the target computer 14 for keeping track of the boot sequence and is used to determine which booting or rebooting step has just been performed. At step S115, the process flag is set to indicate that the initial booting step has been performed. In preferred embodiments, the process flag is stored by writing to the last sector of the hard disk drive of the target computer 14. In alternative embodiments, the process flag may be stored by writing to the boot storage medium 16. However, it is preferable to store the process flag on the memory of the target computer 14, rather than the boot storage medium 16, so that there is no risk of infecting the boot storage medium with any virus.

Next at step S120, the hardware configuration parameters in the CMOS of the target computer 14 are set. The CMOS parameters are first reset to their default values. The CMOS parameters are then set as required by the particular hardware configuration of the target computer 14. For example, a PCMIA slot may be set to card bus mode to support a particular network adapter installed in the target computer 14.

At step S125, the target computer 14 is rebooted for a first time. Next at steps S110 and S130, the stored process flag is used to determine that the rebooting for the first time step has just been performed. At step S135, the process flag is then set to indicate that the rebooting for the first time step has been performed. Next at step S140, the target computer attempts to establish a network connection with the installation server 18 through the LAN 12. At step S150, it is verified that such a network connection has been established. In preferred embodiments, identification data associated with the hardware configuration of the target computer 14 is then retrieved from the memory of the target computer 14 at step S160. In one embodiment, the unique part number which indicates the particular type, model, and hardware configuration of the target computer 14 is retrieved from the BIOS storage area of the target computer 14. However, in alternative embodiments, other identification data may be retrieved, such as the model name and number of the target computer 14, or the like.

After the identification data is retrieved, the database on the installation server 18 is checked to determine which directory in the library of software bundles stored on the memory of the installation server 18 contains the pre-install corresponding to the particular target computer 14 indicated by the retrieved identification data. At step S170, the directory is checked to verify that the files necessary for installing the initial software configuration onto the target computer 14 are stored in that directory on the memory of the installation server 18. If the necessary files are not stored on the memory of the installation server 18, the installation process prematurely terminates and an error message indicating that the installation process failed is displayed on the display 22 of the target computer at step S260.

Otherwise, if the necessary files are stored on the memory of the installation server 18, the hard disk drive of the target computer 14 is partitioned. In preferred embodiments, instructions for partitioning the hard disk drive of the target computer 14 are retrieved from the memory of the installation server 18. At step S175, all partitioning and formatting information is erased from the hard disk drive of the target computer. Then at step S180, the hard disk drive of the target computer 14 is partitioned in accordance with the instructions. In alternative embodiments, prior to partitioning the hard disk drive of the target computer 14, the size of the hard disk drive is determined because it will control which partitioning scheme or instructions to use in partitioning the hard disk drive. In further alternative embodiments, the drive letter assigned to the CD-ROM drive is determined before the hard disk drive is partitioned because it will affect the number of hard disk drive partitions.

Next at step S185, after the hard disk drive is partitioned, the target computer 14 is rebooted for a second time. At steps S110 and S130, the stored process flag is again used to determine that the rebooting for the second time step has just been performed. Next at step S200, the target computer attempts to establish a network connection with the installation server 18 through the LAN 12. At step S210, it is verified that such a network connection has been established. In preferred embodiments, instructions for formatting the hard disk drive of the target computer 14 are retrieved from the memory of the installation server 18. Then at step S215, the hard disk drive of the target computer 14 is formatted in accordance with the instructions.

At step S220, after the hard disk drive of the target computer 14 has been formatted, the software bundle for the initial software configuration (i.e., pre-install) is retrieved and transferred from the memory of the installation server 18 to the memory of the target computer 14 based on the retrieved identification data. In one embodiment, the software bundle is retrieved and transferred from the library directory on the memory of the installation server 18 which contains the pre-install corresponding to the particular target computer 14 indicated by the retrieved identification data (e.g., unique part number of the target computer 14). At step S225, the transferred software bundle is then installed onto the memory of the target computer 14, and the operating environment of the target computer 14 is configured as required by the software. In one embodiment, the software bundle is stored as one or more compressed disk image files which are transferred to the target computer 14. These compressed files are then decompressed or unzipped at the target computer 14 to install the software bundle onto the target computer 14 and configure the operating environment of the target computer 14.

The software bundle installed onto the target computer 14 may include device drivers. In one embodiment, peripheral devices associated with or installed in the target computer 14 (e.g., keyboard, mouse, display, modem, CD- or DVD-ROM drive, and the like) are detected, and the device drivers corresponding to such peripheral devices are installed onto the memory of the target computer 14.

The software bundle may also be configured in accordance with the hardware configuration of the target computer 14. In one embodiment, the initial software configuration or pre-install installed onto the target computer 14 corresponds to multiple target computers 14 which provide different screen resolutions. Accordingly, it is necessary to retrieve the screen resolution provided by the particular target computer 14 from the memory of the target computer 14, preferably the BIOS storage area, and to configure the installed software in accordance with such screen resolution.

In preferred embodiments, after the initial software configuration is installed onto the target computer 14, a virus scan of the hard disk drive is executed to ensure that no viruses are present. However, in alternative embodiments, the virus scan may be omitted. In preferred embodiments, the memory of the target computer 14 is then checked to ensure that the software was transferred and installed correctly onto the memory of the target computer 14. At step S230, it is determined whether or not the installation process was successful. If it was successful, a banner indicating that the installation process was successful is displayed on the display 22 of the target computer 14 at step S240. However, if it was not successful, an error message indicating that the installation process failed is displayed on the display 22 of the target computer 14 at step S260. In one embodiment, to determine whether or not the installation process was successful, all of the files on the hard disk drive of the target computer 14 are read, and a checksum is calculated. The calculated checksum is compared to a checksum stored on the boot storage medium 16 or on the memory of the installation server 18. If the checksums match, the installation process was successful; if the checksums do not match, the installation process failed.

During the installation process, if no network connection is established between the installation server 18 and the target computer 14 through the LAN 12, the CD-ROM drive of the target computer 14 is checked for a valid compact disk at steps S190 and S250. If such a compact disk is available, the installation process continues as described above, except that the software bundles are stored on and transferred from the local compact disk, instead of the memory of the installation server 18. If such a compact disk is not available, the installation process prematurely terminates, and an error message indicating that the installation process failed is displayed on the display 22 of the target computer 14 at step S260.

As described above, the boot storage medium 16 includes all of the necessary logic and other data for automatically installing an initial software configuration on the target computer 14. However, in alternative embodiments, the memory of the installation server 18 may include some of the necessary logic, which can either be executed from the installation server 18 through the LAN 12, or be transferred from the installation server 18 to the target computer 14 and then executed on the target computer 14.

Figure 2:
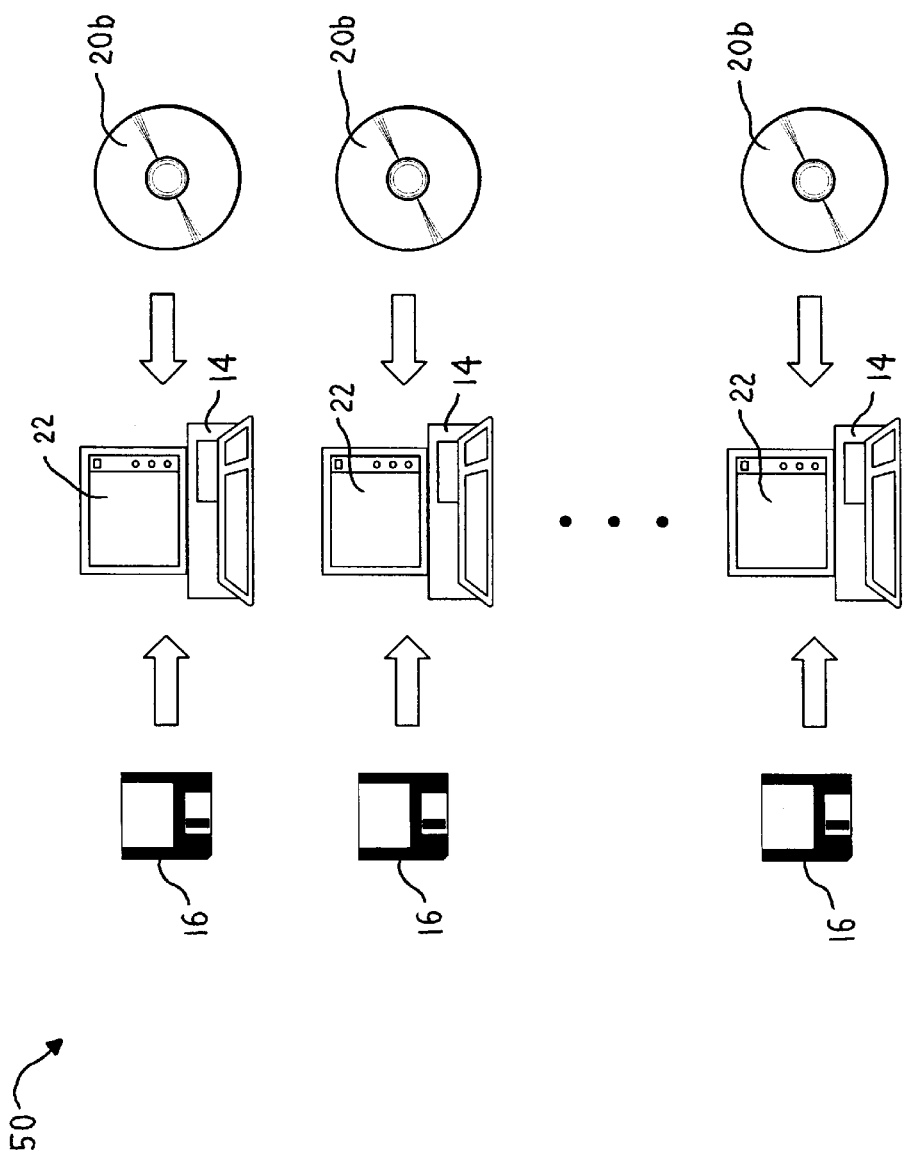
FIG. 2 illustrates a system for automatically installing an initial software configuration onto a computer in accordance with an alternative embodiment of the present invention.

FIG. 2 illustrates the operational environment for the installation method and the basic components of the installation system in accordance with an alternative embodiment of the present invention. In this embodiment, the installation system 50 includes one or more target computers 14 and corresponding boot storage media 16, as in the embodiment illustrated in FIG. 1. However, this installation system 50 does not include a communication link 12 or an installation server 18. Instead, the operating system and other software programs to be installed onto the target computer 14 are stored on a library storage medium 20b local to the target computer 14. In one embodiment, the library storage medium 20b is a compact disk.

In preferred embodiments, the boot storage medium 16 includes all of the necessary logic and other data for automatically installing an initial software configuration on the target computer 14. However, in alternative embodiments, the library storage medium 20b may include some of the necessary logic, including instructions for booting the target computer 14.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In an installation system including at least one target computer, each target computer having a memory, a hardware configuration, and identification data associated with the hardware configuration, a method for automatically installing an initial software configuration on each target computer, the method comprising:

booting the target computer from a boot storage medium;

automatically retrieving the identification data associated with the hardware configuration of the target computer from a BIOS storage area of the target computer, wherein the identification data includes a unique part number;

automatically transferring data representative of software component modules from a library of software component modules stored on a library storage medium to the memory of the target computer based on the retrieved identification data associated with the hardware configuration of the target computer;

automatically transferring data representative of an operating system module from a library of operating system modules, the library containing at least two operating system modules, stored on the library storage medium to the memory of the target computer based on the retrieved identification data associated with the hardware configuration of the target computer; and automatically installing the transferred software component modules and the operating system module onto the memory of the target computer.

2. The method of claim 1, wherein the installation system includes a plurality of target computers having different hardware configurations, and further wherein the boot storage medium for each target computer includes logic for booting all of the target computers.

3. The method of claim 1, further comprising the steps of:

setting CMOS parameters of the target computer;

rebooting for a first time the target computer from the boot storage medium after setting the CMOS parameters of the target computer;

erasing data representative of partitioning and formatting information from the memory of the target computer;

partitioning the memory of the target computer;

rebooting for a second time the target computer from the boot storage medium after partitioning the memory of the target computer; and formatting the memory of the target computer prior to automatically transferring the software bundle.

4. The method of claim 3, further comprising the steps of:

storing data representative of a process flag in the memory of the target computer for indicating whether the booting step, the rebooting for the first time step, or the rebooting for the second time step has been performed; and after each of the booting step, the rebooting for the first time step, and the rebooting for the second time step, determining which step has been performed based on the process flag.

5. The method of claim 4, wherein the memory of each target computer includes a hard disk drive, and the process flag is stored on the hard disk drive of the target computer.

6. The method of claim 3, further comprising the step of:

retrieving data representative of instructions for partitioning and formatting the memory of the target computer from the library storage medium based on the retrieved identification data associated with the hardware configuration of the target computer, wherein the memory of the target computer is partitioned and formatted in accordance with the instructions for partitioning and formatting the memory of the target computer.

7. The method of claim 1, further comprising the step of:

establishing a network connection between the target computer and a remote installation server having a memory, wherein the library storage medium is the memory of the installation server, and data is transferred between the target computer and the installation server through the network connection.

8. The method of claim 1, wherein the library storage medium includes a compact disk local to each target computer.

9. The method of claim 1, further comprising the steps of:

verifying that the transferred software bundle was successfully installed onto the memory of the target computer; and displaying a message on the target computer indicating that the initial software configuration was successfully installed onto the target computer.

10. The method of claim 1, wherein the memory of each target computer further includes:

a BIOS storage area for storing the identification data associated with the hardware configuration of the target computer; and a hard disk drive onto which the initial software configuration is installed.

11. The method of claim 1, wherein the transferred software bundle installed onto the memory of the target computer includes an operating system appropriate for the hardware configuration of the target computer.

12. The method of claim 11, wherein the identification data associated with the hardware configuration of the target computer further includes a screen resolution provided by the target computer, and the method further comprises the step of:

configuring the operating system installed onto the memory of the target computer in accordance with the screen resolution provided by the target computer.

13. The method of claim 1, further comprising the step of:

detecting one or more devices installed onto the target computer, wherein the transferred software bundle installed onto the memory of the target computer includes one or more device drivers corresponding to the devices installed on the target computer.

14. In an installation system including a plurality of target computers, each target computer having a memory, a hardware configuration, and identification data associated with the hardware configuration, and the plurality of target computers having different hardware configurations, a method for automatically installing operating system software on each target computer, the method comprising:

booting the target computer from a boot storage medium, wherein the boot storage medium includes logic for booting all of the target computers;

setting CMOS parameters of the target computer;

rebooting for a first time the target computer from the boot storage medium;

automatically retrieving the identification data associated with the hardware configuration of the target computer from a BIOS storage area of the target computer, wherein the identification data includes a unique part number;

erasing data representative of formatting and partitioning information from the memory of the target computer;

partitioning the memory of the target computer;

rebooting for a second time the target computer from the boot storage medium;

formatting the memory of the target computer;

automatically transferring data representative of operating system software component modules from a library of operating system software modules, the library containing at least two operating system modules, stored on a library storage medium to the memory of the target computer based on the retrieved identification data associated with the hardware configuration of the target computer; and automatically installing the transferred software component modules and the operating system module onto the memory of the target computer.

15. The method of claim 14, further comprising the steps of:
   storing data representative of a process flag in the memory of the target computer for indicating whether the booting step, the rebooting for the first time step, or the rebooting for the second time step has been performed; and
   after each of the booting step, the rebooting for the first time step, and the rebooting for the second time step, determining which step has been performed based on the process flag.

16. An installation system comprising:
   at least one target computer, each target computer having a memory, a hardware configuration, and identification data associated with the hardware configuration, wherein the identification data includes a unique part number and is stored in a BIOS storage area;
   a library storage medium for storing data representative of software component modules in a library of software component modules; and
   a boot storage medium for each target computer, each boot storage medium including logic for performing:
      booting the target computer from the boot storage medium;
      automatically retrieving the identification data associated with the hardware configuration of the target computer from the memory of the target computer;
      automatically transferring data representative of software component modules from the library of software component modules stored on the library storage medium to the memory of the target computer based on the retrieved identification data associated with the hardware configuration of the target computer;
      automatically transferring data representative of an operating system module from a library of operating system modules, the library containing at least two operating system modules, stored on the library storage medium to the memory of the target computer based on the retrieved identification data associated with the hardware configuration of the target computer; and
      automatically installing the transferred software component modules and the operating system module onto the memory of the target computer.

17. The system of claim 16, wherein the installation system comprises a plurality of target computers having different hardware configurations, and further wherein the boot storage medium for each target computer includes logic for booting all of the target computers.

18. The system of claim 16, wherein the library storage medium further includes data representative of instructions for partitioning and formatting the memory of each target computer.

19. The system of claim 16, further comprising:
   a communications link; and
   a remote installation server having a memory, wherein the remote installation server is intermittently coupled to each target computer through the communications link, and further wherein the library storage medium is the memory of the installation server, and data is transferred between each target computer and the installation server through the communications link.

20. The system of claim 19, wherein the memory of the installation server includes a hard disk drive, and the library storage medium is the hard disk drive of the installation server.

21. The system of claim 16, wherein the library storage medium includes a compact disk local to each target computer.

22. The system of claim 16, wherein the memory of each target computer further includes:
   a BIOS storage area for storing the identification data associated with the hardware configuration of the target computer; and
   a hard disk drive onto which the initial software configuration is installed.

23. The system of claim 16, wherein the transferred software bundle installed onto the memory of the target computer includes an operating system appropriate for the hardware configuration of the target computer.

24. The system of claim 23, wherein the identification data associated with the hardware configuration of the target computer further includes a unique part number of the target computer, and further wherein the operating system installed onto the target computer corresponds to the unique part number of the target computer.

25. The system of claim 23, wherein the identification data associated with the hardware configuration of the target computer further includes a screen resolution provided by the target computer, and further wherein the operating system installed onto the memory of the target computer is configured in accordance with the screen resolution provided by the target computer.

26. The system of claim 16, wherein each target computer includes one or more devices installed on the target computer, and the transferred software bundle installed onto the memory of the target computer includes one or more device drivers corresponding to the devices installed on the target computer.

27. An installation system comprising:
   a plurality of target computers, each target computer having a memory, a hardware configuration, and identification data associated with the hardware configuration;
   a library storage medium for storing data representative of software component modules in a library of software component modules; and
   a boot storage medium for each target computer, each boot storage medium including logic for performing:
      booting all of the target computers from the boot storage medium;
      setting CMOS parameters of the target computer;
      rebooting for a first time the target computer from the boot storage medium;
      automatically retrieving the identification data associated with the hardware configuration of the target computer from a BIOS storage area of the target computer, wherein the identification data includes a unique part number;
      erasing data representative of formatting and partitioning information from the memory of the target computer;
      partitioning the memory of the target computer;
      rebooting for a second time the target computer from the boot storage medium;
      formatting the memory of the target computer;
      automatically transferring data representative of software component modules from the library of software component modules stored on the library storage medium to the memory of the target computer based on the retrieved identification data associated with the hardware configuration of the target computer;

automatically transferring data representative of an operating system module from a library of operating system modules, the library containing at least two operating system modules, stored on the library storage medium to the memory of the target computer based on the retrieved identification data associated with the hardware configuration of the target computer; and automatically installing the transferred software component modules and the operating system module onto the memory of the target computer.

28. The system of claim 27, further comprising:

a communications link; and a remote installation server having a memory, wherein the remote installation server is intermittently coupled to each target computer through the communications link, and further wherein the library storage medium is the memory of the installation server, and data is transferred between each target computer and the installation server through the communications link.

29. The system of claim 27, wherein the memory of the installation server includes a hard disk drive, and the library storage medium is the hard disk drive of the installation server.

30. The system of claim 27, wherein the library storage medium includes a compact disk local to each target computer.

31. For an installation system including at least one target computer, a computer-readable boot storage medium for automatically installing an initial software configuration onto each target computer, each target computer having a memory, a hardware configuration, and identification data associated with the hardware configuration, the boot storage medium for each target computer including encoded instructions for performing:

booting the target computer from the boot storage medium;

automatically retrieving the identification data associated with the hardware configuration of the target computer from a BIOS storage area of the target computer, wherein the identification data includes a unique part number;

automatically transferring data representative of software component modules from a library of software component modules stored on a library storage medium to the memory of the target computer based on the retrieved identification data associated with the hardware configuration of the target computer;

automatically transferring data representative of an operating system module from a library of operating system modules, the library containing at least two operating system modules, stored on the library storage medium to the memory of the target computer based on the retrieved identification data associated with the hardware configuration of the target computer; and automatically installing the transferred software component modules and the operating system module onto the memory of the target computer.

32. The boot storage medium of claim 31, wherein the installation system includes a plurality of target computers having different hardware configurations, and further wherein the boot storage medium for each target computer includes encoded instructions for booting all of the target computers.

33. The boot storage medium of claim 31, wherein the boot storage medium for each target computer further includes encoded instructions for performing the steps of:

setting CMOS parameters of the target computer;

rebooting for a first time the target computer from the boot storage medium after setting the CMOS parameters of the target computer;

erasing data representative of partitioning and formatting information from the memory of the target computer;

partitioning the memory of the target computer;

rebooting for a second time the target computer from the boot storage medium after partitioning the memory of the target computer; and formatting the memory of the target computer prior to automatically transferring the software bundle.

34. The boot storage medium of claim 33, wherein the boot storage medium for each target computer further includes encoded instructions for performing the steps of:

storing data representative of a process flag in the memory of the target computer for indicating whether the booting step, the rebooting for the first time step, or the rebooting for the second time step has been performed; and after each of the booting step, the rebooting for the first time step, and the rebooting for the second time step, determining which step has been performed based on the process flag.

35. The boot storage medium of claim 34, wherein the memory of each target computer includes a hard disk drive, and the process flag is stored on the hard disk drive of the target computer.

36. The method of claim 1, wherein the library storage medium is a compact disk local to the target computer.

37. The method of claim 1, further including storing a process flag in the memory of the target computer to keep track of a boot sequence.

38. The method of claim 14, wherein the library storage medium is a compact disk local to the target computer.

39. The method of claim 14, further including storing a process flag in the memory of the target computer to keep track of a boot sequence.

40. The method of claim 16, wherein the library storage medium is a compact disk local to the target computer.

41. The method of claim 16, further including storing a process flag in the memory of the target computer to keep track of a boot sequence.

42. The method of claim 27, wherein the library storage medium is a compact disk local to the target computer.

43. The method of claim 27, further including storing a process flag in the memory of the target computer to keep track of a boot sequence.

44. The method of claim 31, wherein the library storage medium is a compact disk local to the target compute.

45. The method of claim 31, further including storing a process flag in the memory of the target computer to keep track of a boot sequence.

* * * * *